United States Patent [19]

Ohba et al.

[11] Patent Number: 5,501,471
[45] Date of Patent: Mar. 26, 1996

[54] MECHANICAL SEAL WITH BLADE-LIKE SEALING END

[75] Inventors: Kanji Ohba, Kobe; Takeo Nakajima, Sanda; Yuichi Tamura, Kobe, all of Japan

[73] Assignee: Nippon Pillar Packing Co., Ltd., Osaka, Japan

[21] Appl. No.: 247,120

[22] Filed: May 20, 1994

Related U.S. Application Data

[63] Continuation of Ser. No. 853,749, filed as PCT/JP91/00158, Feb. 8, 1991, abandoned.

[51] Int. Cl.$^6$ ........................................ F16J 15/34
[52] U.S. Cl. ........................................ 277/96.1; 277/85
[58] Field of Search .................... 277/38–43, 81 R, 277/85, 93 R, 96, 96.1, 96.2

[56] References Cited

U.S. PATENT DOCUMENTS

| | | | |
|---|---|---|---|
| 2,023,206 | 12/1935 | Olson | 277/81 R X |
| 2,189,686 | 2/1940 | Stevenson | 277/39 X |
| 2,243,227 | 5/1941 | Stratton | 277/81 R X |
| 2,365,046 | 12/1944 | Bottomley | 277/85 X |
| 2,944,843 | 7/1960 | Colby | 277/96 X |
| 2,992,843 | 7/1961 | Smith | 277/961 X |
| 3,003,796 | 10/1961 | Meyer | 277/38 |
| 3,339,946 | 9/1967 | Kreidel, Sr. et al. | 277/96 X |
| 3,527,511 | 9/1970 | Whittle | 277/93 X |
| 3,612,548 | 10/1971 | Tracy | 277/93 R X |
| 3,874,680 | 4/1975 | Mustoe et al. | 277/96 |
| 4,142,731 | 3/1979 | Filippou et al. | 277/96.1 |
| 4,268,232 | 5/1981 | Haupt | 277/93 R X |
| 4,306,727 | 12/1981 | Deane et al. | 277/81 R X |
| 4,335,888 | 6/1982 | Ohba et al. | 277/96.1 |
| 4,444,399 | 4/1984 | Yanai et al. | 277/96.1 X |

FOREIGN PATENT DOCUMENTS

| | | | |
|---|---|---|---|
| 011587 | 5/1980 | European Pat. Off. | 277/85 |
| 328433 | 8/1989 | European Pat. Off. | 277/81 R |
| 385138 | 9/1990 | European Pat. Off. | 277/81 R |
| 1240567 | 8/1960 | France | 277/96 |
| 514988 | 10/1926 | Germany | 277/93 |
| 409185 | 2/1945 | Italy | 277/81 R |
| 40-19885 | 9/1965 | Japan . | |
| 57-157864 | 9/1982 | Japan . | |
| 60-3365 | 1/1985 | Japan . | |
| 62-56391 | 11/1987 | Japan . | |
| 1-28379 | 8/1989 | Japan . | |
| 185976 | 7/1992 | Japan | 277/85 |
| 709876 | 1/1980 | U.S.S.R. | 277/81 R |
| 1378002 | 12/1974 | United Kingdom | 277/85 |

OTHER PUBLICATIONS

E. Mayer, "Mechanical Seals (2nd ed.)", Apr. 1973, p. 75.
H. Hugo Buchter, "Industrial Sealing Technology", Jul. 1986, pp. 148–153, 186–197.

Primary Examiner—Scott W. Cummings
Attorney, Agent, or Firm—Jones, Tullar & Cooper

[57] ABSTRACT

The present invention relates to a mechanical seal for a shaft, having a rotary seal ring and a stationary seal ring which slide on and come in contact with each other for sealing a fluid. A blade-like sealing end portion formed at one seal ring is resiliently pressed, through a coil spring or a flat leaf spring, to a flat sealing end surface formed at the other seal ring. The blade-like sealing end portion is symmetrical at the inner and outer peripheral surfaces thereof with respect to the edge surface thereof, and the angles formed by the inner and outer peripheral surfaces of the sealing end portion with respect to the edge surface thereof are set to 90° or more, and preferably in the range from 105° to 150°. This facilitates the machining of the sealing end portion and prevents the sealing end portion from being broken, thus assuring a stable sealing performance for a long period of time. Further, the spring surface pressure is increased to assure an excellent sealing performance even though the pressure greatly varies.

9 Claims, 4 Drawing Sheets

MECHANICAL SEAL WITH BLADE-LIKE SEALING END

This is a continuation of application Ser. No. 07/853,749 filed as PCT/JP91/00158, Feb. 8, 1991, now abandoned.

BACKGROUND OF THE INVENTION

1. Technical Field

The present invention relates to a seal used as a shaft seal part in a rotary apparatus for treating a liquid. More particularly, the present invention relates to a mechanical seal suitably used as a shaft seal in a rotary apparatus used in the chemical industry which handles a highly corrosive liquid liable to be readily solidified, particularly a rubber-nature fluid such as latex or the like which can be solidified by shear friction, a plastic fluid which can be copolymerized and solidified by sliding frictional heat, a petroleum fluid such as highly viscous heavy oil or the like, a black liquid used in the pulp industry, muddy water containing a great amount of slurry, or the like.

2. Prior Art

There are known the following mechanical seals as examples of a shaft seal in a pump for delivering a rubber-nature fluid such as latex or the like.

The mechanical seal shown in FIG. 5 is disposed between the outer peripheral surface of a rotary shaft 1, and the inner peripheral surface of a stationary casing 2. An impeller 3 is fitted on the peripheral surface of that part of the rotary shaft 1 at the pump chamber side. A rotary seal ring 4 is disposed between a shaft-seal-side end surface 3a of the impeller 3 and a stepped portion 1a of the rotary shaft 1 which is opposite to the shaft-seal-side end surface 3a. The rotary seal ring 4 is engaged with a knock pin 5 projecting from the end surface 3a of the impeller 3, and is secured to the outer peripheral surface of the rotary shaft 1 with the gap between the end surface 3a and the stepped portion 1a sealed through an O-ring 6. Thus, the rotary seal ring 4 is rotated integrally with the rotary shaft 1.

A retainer 8 is attached to the inner peripheral surface of the casing 2 by a bolt 7. An adapter ring 10 is attached to the retainer 8. The gap between the adapter ring 10 and the inner peripheral surface of the casing 2 is sealed by an O-ring 9. Through a bellows 11 formed from metal, a seal ring retainer 12 is supported by the adapter ring 10. A stationary seal ring 13 having a flat sealing end surface 13a is secured to the seal ring retainer 12. The rotary seal ring 4 has a sharp blade-like sealing end portion 4a, which slides on the sealing end surface 13a.

Secured to the retainer 8 is a buffle ring 14 the tip of which reaches in the vicinity of the inner end of the stationary seal ring 13. At the outer periphery of the buffle ring 14, a mono-coil spring 15 is interposed between the retainer 8 and the seal ring retainer 12, to bias and move the stationary seal ring 13 toward the rotary seal ring 4. Thus, the flat sealing end surface 13a is resiliently pressed against the sealing end portion 4a of the rotary seal ring 4.

The mechanical seal shown in FIG. 6 is of the type where no bellows is used. Likewise in the mechanical seal in FIG. 6, the rotary seal ring 4 is secured to the outer periphery of the rotary shaft 1. On the other hand, the stationary seal ring 13 is secured to the tip of a seal ring retainer 17 disposed at the inner peripheral surface of the casing 2 through an O-ring 16. The stationary seal ring 13 is moved toward the rotary seal ring 4 by the spring load of a plurality of circumferentially disposed multi-coil springs 19 which are held by a spring retainer 18 formed integrally with the casing 2. The blade-like sealing end portion 13a formed at the stationary seal ring 13 is resiliently pressed to the flat sealing end surface 4a of the rotary seal ring 4.

The mechanical seal shown in FIG. 7 is of the type that no bellows is used likewise as in the mechanical seal shown in FIG. 6. The rotary shaft 1 has a small-diameter part 1b at the air side and a large-diameter part 1c at the side of a fluid to be sealed. The rotary seal ring 4 is fitted, in a liquid-tight manner, on the outer periphery of the large-diameter part 1c through an O-ring 20. On the other hand, the stationary seal ring 13 is rotatably fitted on the small-diameter meter part 1b of the rotary shaft 1 and secured to the inner peripheral surface of the casing 2. The rotary seal ring 4 is moved toward the stationary seal ring 13 by the spring load of a plurality of circumferentially disposed multi-coil springs 19 which are held by a spring retainer 21 secured to the outer periphery of the large-diameter part 1c of the rotary shaft 1. The flat sealing end surface 4a of the rotary seal ring 4 is resiliently pressed to the blade-like sealing end portion 13a of the stationary seal ring 13.

In any of the conventional mechanical seals shown in FIGS. 5 to 7, the blade-like sealing end portion 4a or 13a is asymmetrical in configuration in that, as shown in FIG. 8, the outer peripheral surface 4a1 or 13a1 of the blade-like sealing end portion 4a or 13a is parallel with the axis of the rotary shaft 1 while the inner peripheral surface 4a2 or 13a2 of the blade-like sealing end portion 4a or 13a is inclined with respect to the axis of the rotary shaft 1. Also as shown in FIG. 8, the angle θ formed by the outer peripheral surface 4a1 or 13a1 with respect to the edge surface 4a3 or 13a3 is set to 90° or less.

In any of the conventional mechanical seals mentioned above, the inner and outer peripheral surfaces of the blade-like sealing end portion 4a or 13a are asymmetrical with respect to the edge surface. This requires a highly advanced machining technique, so that the production cost is expensive. Further, the angle formed by the outer peripheral surface 4a1 or 13a1 with respect to the edge surface 4a3 or 13a3 is not greater than 90°. Accordingly, at the time of machining or when the edge surface 4a3 or 13a3 is resiliently pressed to the flat sealing end surface 13a or 4a and the edge surface 4a3 or 13a3 and the sealing end surface 13a or 4a slide on and come in contact with each other while being rotated, the corner part of the edge surface 4a3 or 13a3 is liable to be broken. This makes it difficult to produce a predetermined sealing effect in a stable manner.

In the conventional mechanical seal shown in FIG. 5, the mono-coil spring 15 is combined with the bellows 11 formed from metal. Accordingly, the structure is not only complicated, but also expensive. Further, the mechanical seal becomes lengthened. Moreover, due to the limited spring load of the metal-formed bellows 11, such a mechanical seal is not suitable for use under the condition of great change in resilient pressure.

In any of the conventional mechanical seals shown in FIGS. 6 and 7, no metal-formed bellows is used. Accordingly, such a mechanical seal is simpler in structure than the mechanical seal in FIG. 5. In the mechanical seal in FIG. 6, however, when the O-ring 16 gets clogged with a solidified body, the retainer 17 cannot be smoothly moved. Further, the balance diameter D becomes great as compared with the edge surface diameter. Accordingly, at the time when the pressure varies, particularly when a reverse pressure is generated, a great opening force acts on the sealing end portion 13a and the sealing end surface 4a. Therefore, the sealing performance is lowered or lost, thus involving the likelihood that the fluid will leak. Accordingly, the application of such a mechanical seal is limited. In the mechanical seal shown in FIG. 7, the multi-coil springs 19 are liable to get clogged with dust, dirt, a solidified body or the like, thus preventing the mechanical seal from properly operating. Further, the O-ring 20 is liable to stick.

SUMMARY OF THE INVENTION

In view of the foregoing, the present invention is proposed with the object of providing the following mechanical seal having a rotary seal ring and a stationary seal ring which slide on and come in contact with each other for sealing a fluid. A blade-like sealing end portion formed at one seal ring is resiliently pressed, through spring means, to a flat sealing end surface formed at the other seal ring. The blade-like sealing end portion is symmetrical in configuration at the inner and outer peripheral surfaces thereof with respect to the edge surface thereof. This facilitates the machining of the blade-like sealing end portion, thus lowering the production cost. Further, the angles formed by the inner and outer peripheral surfaces of the blade-like sealing end portion with respect to the edge surface thereof are set to an angle not less than 90°. This prevents the sealing end portion from being broken at the time of production and operation, thus assuring a stable sealing performance for a long period of time.

According to the mechanical seal of the present invention, the blade-like sealing end portion formed at one of the rotary and stationary seal rings is symmetrical at the inner and outer peripheral surfaces thereof with respect to the edge surface thereof, and the angles formed by the inner and outer peripheral surfaces thereof with respect to the edge surface thereof are set to 90° or more, and preferably in the range from 105° to 150°. Accordingly, the inner and outer peripheral surfaces of the sealing end portion can be readily machined with high precision with common machining means. This lowers the production cost. Further, the sealing end portion has no corner of angle of which is less than 90°. This prevents the sealing end portion from being broken at the time of production and operation. This assures such an excellent sealing performance as to be required for a mechanical seal of this type, in a stable manner for a long period of time. Since the sealing end portion is made in the form which is hardly broken, there can be used, as the material of the sealing end portion, not only hard metal mainly composed of WC, but also relatively fragile carbon and ceramics. Thus, the material cost can also be lowered.

As the spring means, a mono-coil spring is used as disposed outside of a fluid space, and a packing serving as a secondary seal is covered with and protected by an axially stretchable V-shaped seal. This prevents the spring and the secondary seal from getting clogged with a solidified body or the like, yet maintaining the spring properties. Accordingly, the mechanical seal of the present invention can be improved in operational effect and can assure an excellent sealing performance in a stable manner for a long period of time.

As the spring means, a flat leaf spring is used as disposed inside or outside of the fluid space. Accordingly, the mechanical seal can be simplified and shortened in structure and lowered in cost. Further, since the balance diameter can be minimized with respect to the diameter of the edge surface, a high surface pressure can be maintained. Thus, in combination with such structure as to minimize the possibility of the spring means and the packing getting clogged with a solidified body or the like, the mechanical seal of the present invention assures an excellent sealing performance even though the pressure greatly varies.

DETAILED DESCRIPTION OF THE PREFERRED OF THE INVENTION

Figure 1:
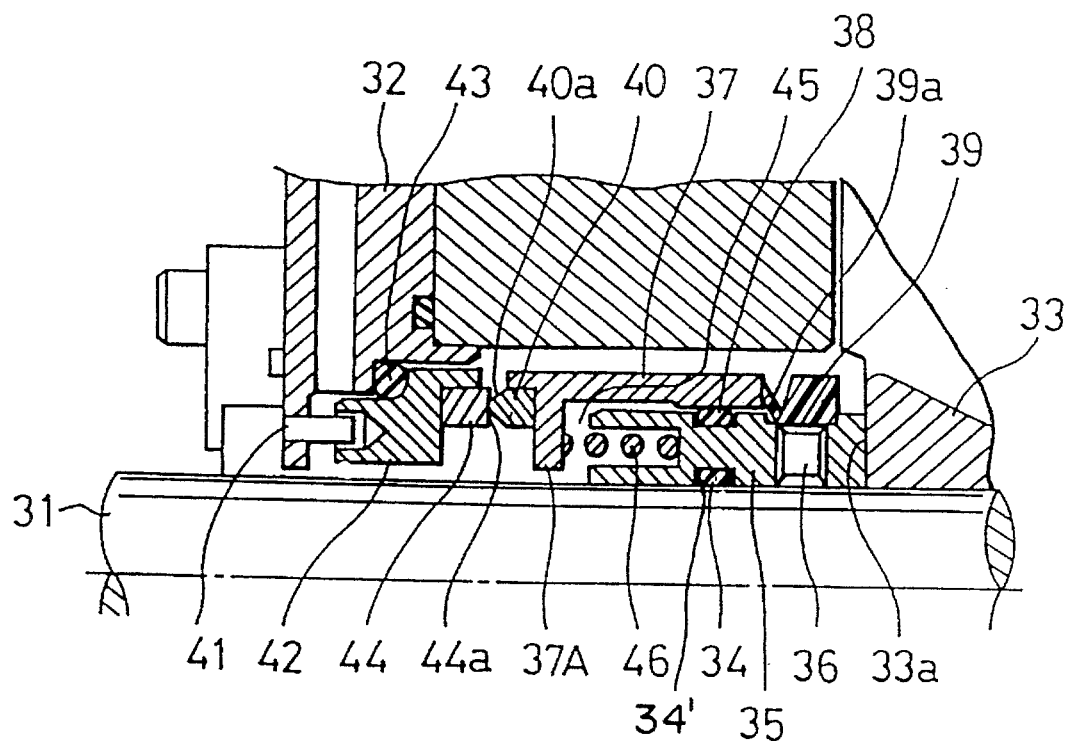
FIG. 1 is a partial sectional view of a mechanical seal in accordance with an embodiment of the present invention.

FIG. 1 is a partial sectional view of a mechanical seal in accordance with an embodiment of the present invention. In FIG. 1, a rotary shaft 31 and a casing 32 of a fluid delivering pump are disposed at the rotary side and the stationary side, respectively. The following mechanical seal is disposed, as a shaft seal, between the outer peripheral surface of the rotary shaft 31 and the inner peripheral surface of the casing 32.

An impeller 33 is fitted on the peripheral surface of that part of the rotary shaft 31 at the pump chamber side. A spring retainer 35 comes in close contact with a shaft-seal-side end surface 33a of the impeller 33 and is secured to the rotary shaft 31 through a screw 36 with the gap between the spring retainer 35 and the outer peripheral surface of the rotary shaft 31 sealed through an O-ring 34. The O-ring 34 is received in a groove 34' in the spring retainer 35. A seal ring retainer 37 is fitted on the outer peripheral surface of the spring retainer 35 with the gap between the inner peripheral surface of the seal ring retainer 37 and the outer peripheral surface of the spring retainer 35 sealed by an O-ring 38 serving as a secondary seal packing. A seal ring 39 is interposed between the end surface of the seal ring retainer 37 at the impeller 33 side and the spring retainer 35. The seal ring 39 has a V-shaped sealing portion 39a which is stretchable in the axial direction. The seal ring 39 covers and protects the O-ring 38. The seal ring retainer 37 is provided at the other end thereof with a rotary seal ring 40 adapted to be rotated integrally with the rotary shaft 31.

A retainer 42 is attached to the inner peripheral surface of the casing 32 through a knock pin 41. The gap between the retainer 42 and the inner peripheral surface of the casing 32 is sealed by an O-ring 43. Secured to the end of the retainer 42 is a stationary seal ring 44 having a flat sealing end surface 44a on which slides a blade-like sealing end portion 40a formed on the rotary seal ring 40.

Inside of a fluid space 45 to be sealed by the seal ring retainer 37, the seal ring 39 and the O-ring 38, a mono-coil spring 46 is disposed between an inwardly projecting ring-like portion 37A of the seal ring retainer 37 and the spring retainer 35 which is axially opposite thereto. Accordingly, the rotary seal ring 40 is biased and moved toward the stationary seal ring 44, so that the sealing end portion 40a is resiliently pressed against the flat sealing end surface 44a of the stationary seal ring 44.

Figure 2:
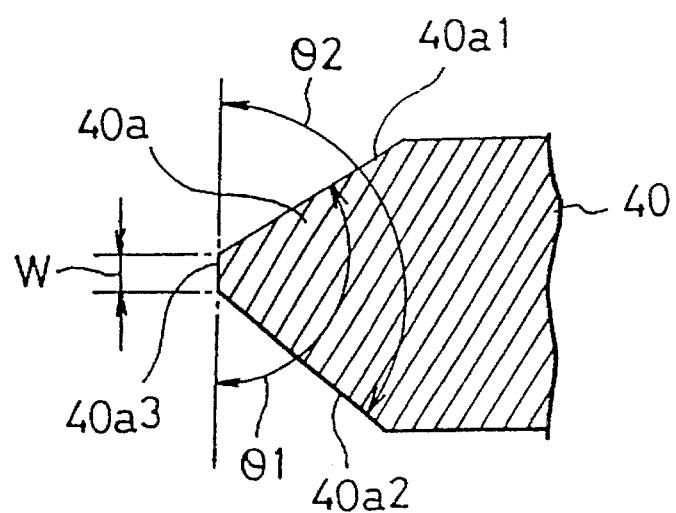
FIG. 2 is an enlarged sectional view of a sealing end portion.

As clearly shown in FIG. 2, the sealing end portion 40a of the rotary seal ring 40 is symmetrical in configuration at the inner peripheral surface 40a2 and the outer peripheral surface 40a1 thereof with respect to the edge surface 40a3 thereof, such that the outer peripheral surface 40a1 and the inner peripheral surface 40a2 of the sealing end portion 40a are respectively inclined at angles $\theta1$ and $\theta2$ ($\theta1=\theta2$) with respect to the edge surface 40a3 having a width W in the range from 0.1 mm to 0.3 mm, the angle $\theta1$ ($=\theta2$) being not less than 90° and less than 180°. The maximum diameter of the groove 34' is substantially equal to or is less than the outer diameter of the edge surface 40a3 of the blade-like sealing end portion 40a.

The materials constituting the rotary seal ring 40 and the stationary seal ring 44 are optionally combined as selected from hard metal mainly composed of WC, carbon and ceramics. Examples of the ceramics include carbide-type ceramics such as SiC, TiC, $B_4C$ and the like; oxide-type ceramics such as $Al_2O_3$, $Cr_2O_3$, $TiO_2$, $ZrO_2$ and the like; nitride-type ceramics such as $Si_3N_4$, BN, TiN, NbN and the like; and boride-type ceramics such as $TiB_2$, $ZnB_2$ and the like.

The balance ratio defined by the ratio of the contact area of the seal rings 40, 44 to the pressure receiving area of the flat sealing end surface 44a of the stationary seal ring 44, is substantially set to zero. Accordingly, through the surface pressure exerted by the mono-coil spring 46, the sealing end portion 40a and the sealing end surface 44a slide on and come in contact with each other under a substantially constant pressure inspite of variations of the pressure of the liquid to be sealed. This produces a stable sealing effect.

According to the mechanical seal having the arrangement mentioned above, the sealing end portion 40a of the rotary seal ring 40 is formed such that the inner peripheral surface 40a2 and the outer peripheral surface 40a1 are symmetrical with respect to the edge surface 40a3. Thus, the inner and outer peripheral surfaces can be readily machined with high precision by common machining means, thus reducing the production cost. Further, since the angles $\theta1$ and $\theta2$ are set to the same angle not less than 90° and less than 180°, the blade-like sealing end portion 40a has no corner part presenting an angle less than 90°. This minimizes the occurrence of breakage of the sealing end portion 40a at the time of production and/or operation, thus assuring a predetermining sealing performance in a stable manner for a long period of time.

Further, since the spring 46 is externally fitted and the V-shaped seal ring 39 covers and protects the O-ring 38 serving as a secondary seal, there is no likelihood that the spring 46 and the O-ring 38 will get clogged with dust, dirt, a solidified body and the like. This assures a smooth operation and further improves the sealing performance.

Figure 3:
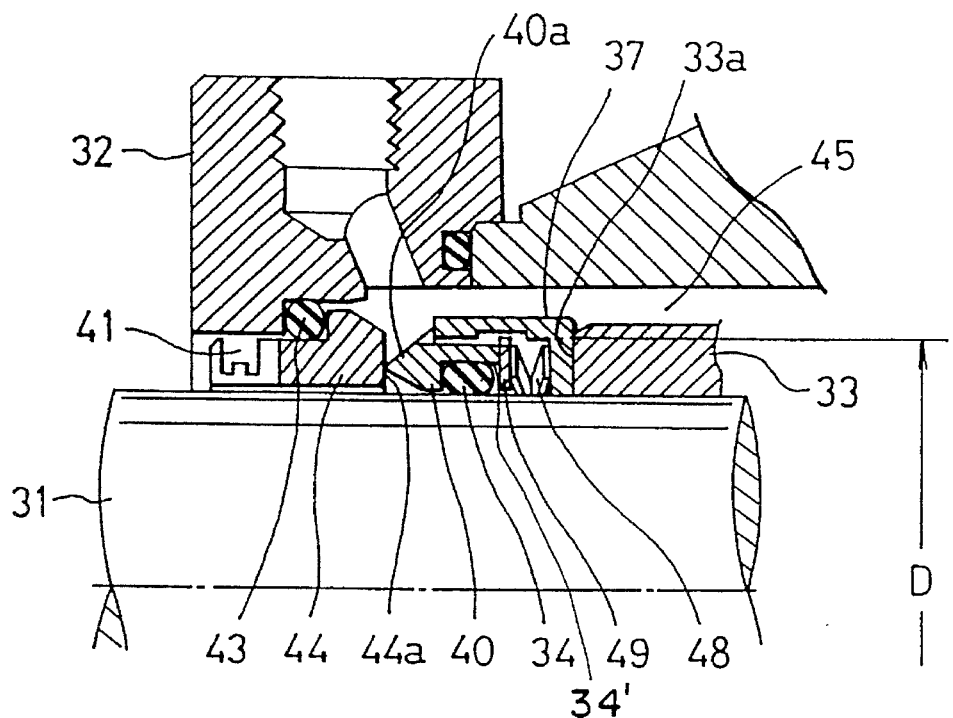
FIG. 3 is a partial sectional view of a mechanical seal in accordance with another embodiment of the present invention.

FIG. 3 is a partial sectional view of the mechanical seal in accordance with another embodiment of the present invention. In the embodiment in FIG. 3, like parts are designated by like reference numerals used in FIG. 1, and are not discussed here in detail.

In FIG. 3, a flat leaf spring 48 is interposed between the seal ring retainer 37 secured to the impeller 33 and a spring bearing ring 49. The spring bearing ring 49 is disposed at the base end of the rotary seal ring 40 held by the seal ring retainer 37 with the gap between the rotary seal ring 40 and the outer peripheral surface of the rotary shaft 31 sealed by the O-ring 34. Accordingly, the rotary seal ring 40 is biased and moved toward the stationary seal ring 44 secured to the inner peripheral surface of the casing 32, so that the sealing end portion 40a is resiliently pressed against the flat sealing end surface 44a. Here again, the O-ring 34 is received in a groove 34'. The groove 34' is formed however in the rotary seal ring 40. The maximum diameter of the groove 34' is substantially equal to or is less than the outer diameter defined by the contact edge of the sealing end portion 40a. In this embodiment, too, the sealing end portion 40a has the same configuration as that shown in FIG. 2.

According to the mechanical seal having the arrangement mentioned above, since the sealing end portion 40a has the configuration as shown in FIG. 2, the sealing end portion 40a can be readily machined and prevented from being broken, thus assuring a predetermined sealing performance in a stable manner for a long period of time. In addition, the mechanical seal in FIG. 3 is so arranged as to not only securely prevent the leaf spring 48 from getting clogged with dust, dirt or the like, but also to shorten the seal part with the structure simplified. Further, the balance diameter D can be minimized with respect to the diameter of the edge surface. This imparts a strong resilient pressure to the sealing surface, thus further improving the sealing performance.

Figure 4:
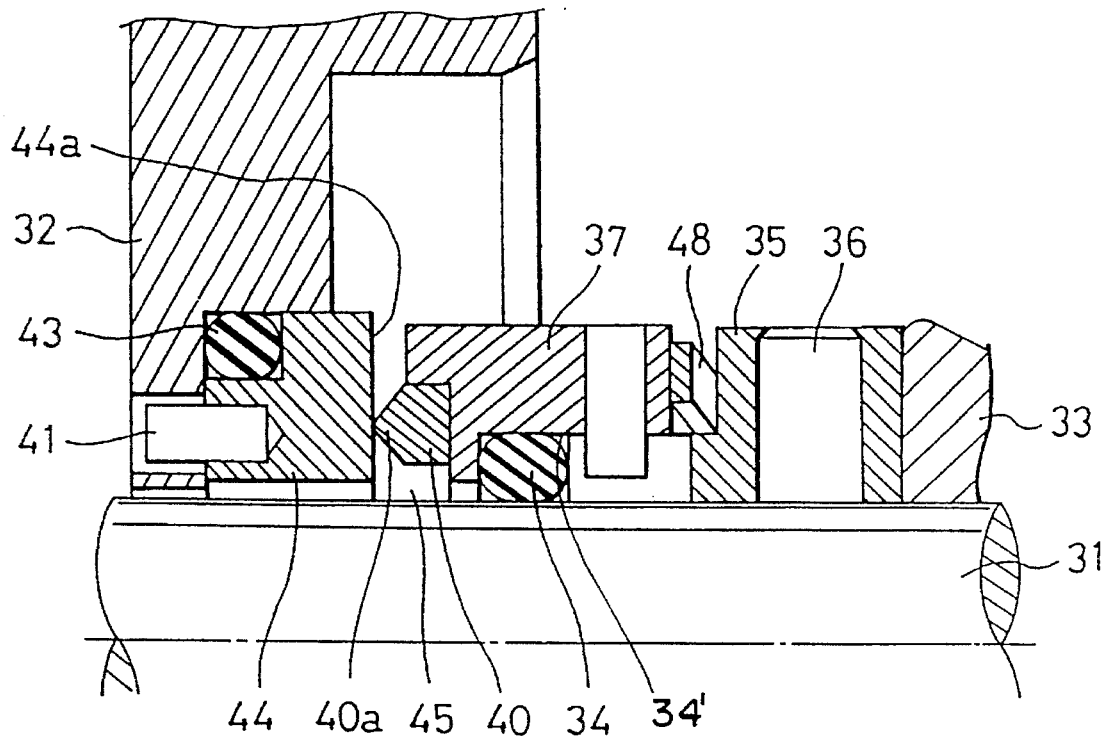
FIG. 4 is a partial sectional view of a mechanical seal in accordance with a further embodiment of the present invention.
Figure 5:
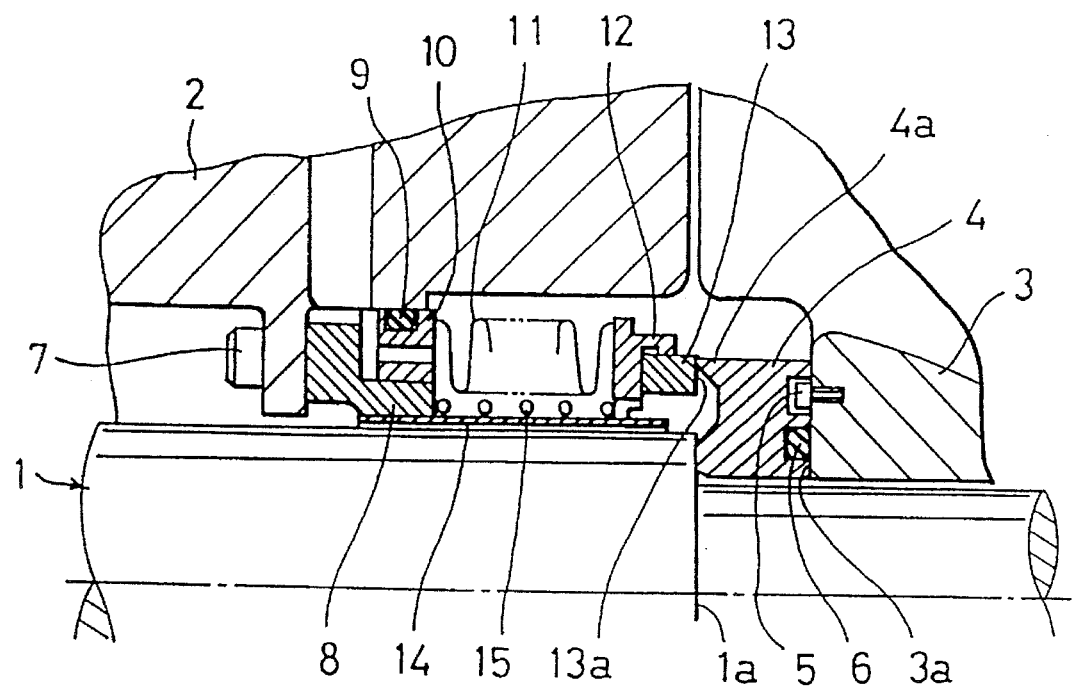
FIGS. 5 to 7 are partial section views of conventional mechanical seals.
Figure 6:
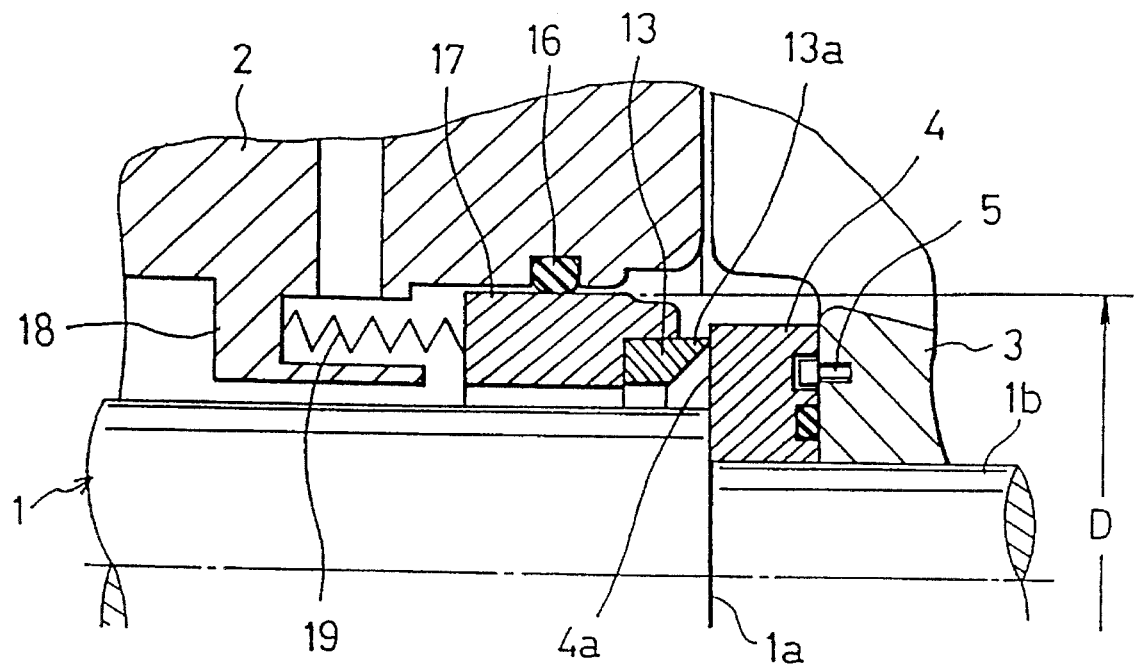
Figure 7:
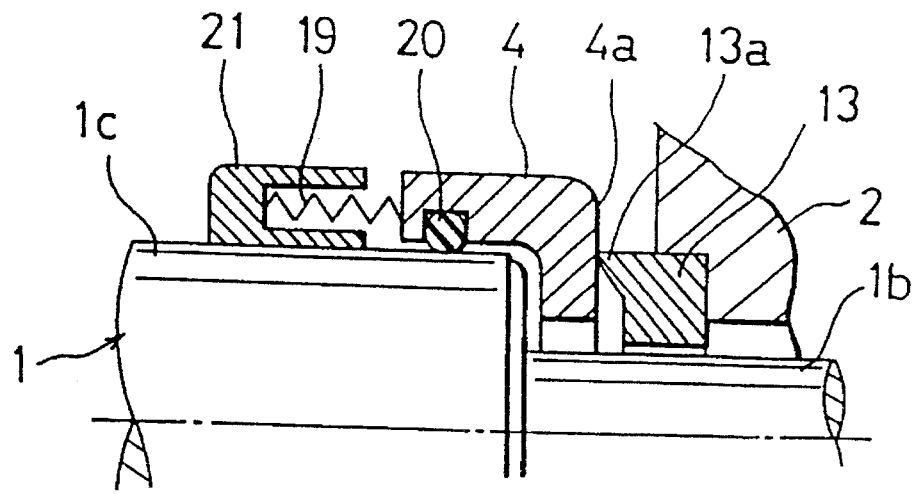
Figure 8:
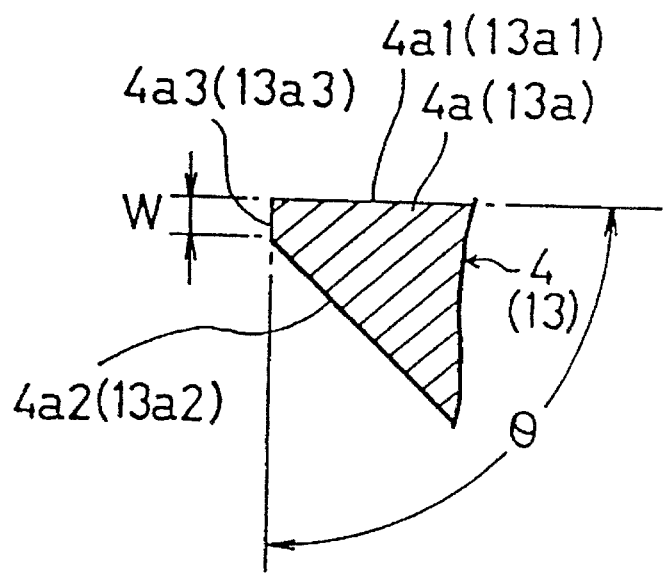
FIG. 8 is an enlarged sectional view of a sealing end portion which is commonly used in the conventional mechanical seals shown in FIGS. 5 to 7.

FIG. 4 is a partial sectional view of the mechanical seal in accordance with a further embodiment of the present invention. In the embodiment in FIG. 4, like parts are designated by like reference numerals used in FIGS. 1 and 3, and are not here discussed in detail.

Outside of the fluid space 45, the flat leaf spring 48 is interposed between the spring retainer 35 secured to the rotary shaft 31 through the screw 36 and the seal ring retainer 37 axially slidably fitted on the rotary shaft 31 with the gap between the seal ring retainer 37 and the rotary shaft 31 sealed by the O-ring 34. Accordingly, the rotary seal ring 40 is biased and moved toward the stationary seal ring 44, so that the sealing end portion 40a is resiliently pressed against the flat sealing end surface 44a. In this embodiment, too, the sealing end portion 40a has the same configuration as that shown in FIG. 2. Here again, the O-ring 34 is received in a groove 34'. The groove 34' is formed however in the sealing retainer 37. The maximum diameter of the groove 34' is substantially equal to or is less than the outer diameter defined by the contact edge of the sealing end portion 40a.

The mechanical seal having the arrangement mentioned above produces effects similar to those produced by the embodiment shown in FIG. 3, such as easy machinability of the sealing end portion 40a, high sealing properties without any breakage thereof, the shortened sealing part and the simplified structure. In addition, the mechanical seal in FIG. 4 further improves the sealing performance because of an increase in the spring surface pressure.

The mechanical seal of the present invention is improved in the configuration of a sealing end portion formed at either one of rotary and stationary seal rings which slide on and come in contact with each other for sealing a fluid. Accordingly, the machining of the sealing end portion is facilitated and a decrease in the sealing performance due to breakage of the sealing end portion is restrained. Further, the operation is smoothly carried out and a strong spring surface pressure can be given at all times. Thus, the mechanical seal of the present invention can be suitably used as a shaft seal in a fluid delivering pump, particularly in a fluid device in the chemical industry that handles a corrosive fluid liable to be solidified containing a great amount of slurry.

What is claimed is:

1. A mechanical seal for a shaft and associated with a fluid space, comprising: a rotary seal ring and a stationary seal ring which slide on and come in contact with each other for sealing a fluid; spring means for biasing one of said seal rings toward the other seal ring so that said one seal ring is resiliently pressed against said other seal ring, one of said seal rings having a flat sealing end surface and the other seal ring having inner and outer peripheral surfaces and an edge surface defining a blade-like sealing end portion which slides on and comes in contact with said flat sealing end surface; an O-ring; and means for receiving the O-ring, said means for receiving said O-ring defining a groove and an O-ring engaging surface in said groove, the diameter of which, in the radial direction of the rotary seal ring, is substantially equal to the outer diameter defined by said edge surface, said blade-like sealing end portion being arranged such that the angles formed by the inner and outer peripheral surfaces thereof with respect to the edge surface thereof are set in the range of 105° to 150°, and the width of the edge surface of said blade-like sealing end portion is set in the range of 0.1 mm to 0.3 mm, wherein the balance ratio determined by the ratio of the contact area of both sealing rings to the pressure receiving area of the flat sealing end surface is set substantially to zero.

2. A mechanical seal according to claim 1, further comprising: a seal ring retainer; and a packing serving as a secondary seal; and an axially stretchable V-shaped seal, wherein said spring means comprises a mono-coil spring disposed outside of the fluid space, said packing is protected by said axially stretchable V-shaped seal, and said V-shaped seal engages said seal ring retainer.

3. A mechanical seal according to claim 1, wherein the spring means comprises a flat leaf spring disposed inside of the fluid space.

4. A mechanical seal according to claim 1, wherein the spring means comprises a flat leaf spring disposed outside of the fluid space.

5. A mechanical seal according to claim 1, wherein the flat sealing end surface and sealing end portion of the seal rings are made of at least one substance selected from the group consisting of hard metal mainly composed of WC, carbon and ceramics of the carbide-, oxide-, nitride- and boride-type.

6. A mechanical seal according to claim 1, wherein the flat sealing end surface and sealing end portion of the seal rings are made of at least one substance selected from the group consisting of hard metal mainly composed of WC, carbon and ceramics of the carbide-, oxide-, nitride- and boride-type.

7. A mechanical seal according to claim 1, wherein said means for receiving said O-ring comprises said spring means.

8. A mechanical seal according to claim 1, wherein said means for receiving said O-ring comprises said rotary seal ring.

9. A mechanical seal according to claim 1, further comprising: a seal ring retainer for mounting said rotary seal ring, and wherein said means for receiving said O-ring comprises said seal ring retainer.

* * * * *